United States Patent Office 3,521,403
Patented July 21, 1970

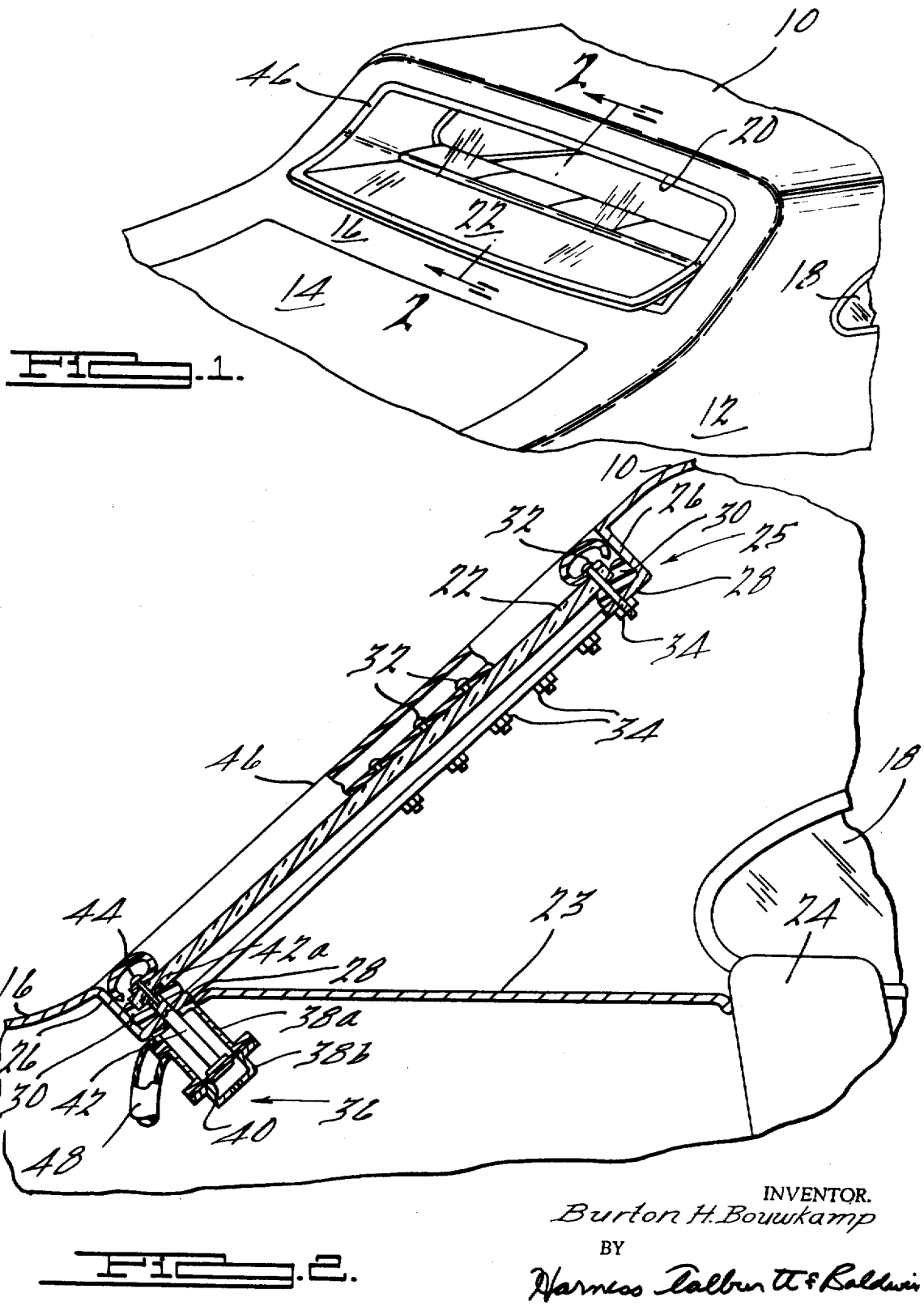

3,521,403
MOTOR VEHICLE REAR WINDOW
CONSTRUCTION
Burton H. Bouwkamp, Bloomfield Hills, Mich., assignor to Chrysler Corporation, Highland Park, Mich., a corporation of Delaware
Filed Dec. 30, 1968, Ser. No. 787,447
Int. Cl. E05f 15/04
U.S. Cl. 49—324           5 Claims

ABSTRACT OF THE DISCLOSURE

A flow through ventilation system for an automobile wherein the rear window of the automobile is formed of a panel of flexible high strength safety glass such as Chemcor which is firmly fixed to the body along its top edge and along the upper portions of its side edges, and sealingly coacts along its lower edge and the lower portions of its side edges with a suitable sealing strip provided along the corresponding portions of the body opening; the lower portion of the glass is free to flex rearwardly to an open position under the urging of a pair of servo motors which are positioned within the automobile beneath the window opening and have power arms engaging the lower edge of the glass.

BACKGROUND OF INVENTION

Flow through ventilation systems (i.e., systems in which air is purposely and positively brought into the forward portion of the passenger compartment of an automobile and purposely and positively evacuated from the rearward portion of the passenger compartment to provide a steady, cleansing and ventilating flow of air through the passenger compartment), have been popular in recent years and will probably continue to enjoy popularity with the increase in automobiles having ventless side glass. Previously proposed automotive flow through ventilation systems have been unsatisfactory in that either they required extensive and costly alteration of the vehicle sheet metal or they did not provide the required rate of air flow to do an effective job of cleansing and ventilating the passenger compartment.

SUMMARY OF THE INVENTION

It is an object of the present invention to provide an improved automotive ventilation system of the flow through type.

A more specific object is to provide a flow through ventilation system which is inexpensive and yet highly effective.

According to the invention, the rear window of the vehicle comprises a flexible glass panel with the periphery of a portion of the glass firmly fixed to the body and the periphery of the remaining portion of the glass sealingly coacting with sealing means around the body opening; the sealing means engages with the forward edge of the glass so that this portion of the glass is free to be moved rearwardly away from the sealing means, and actuator means engage this unrestrained glass portion and operate to flex it relative to the fixed portion to selectively open and close the window.

In the described embodiment, the upper peripheral edge of the glass and the upper portions of the side edges of the glass are fixed to the vehicle body and the motor means engages the glass adjacent the lower edge and operates to flex the lower portion of the glass upwardly and rearwardly with respect to the fixed upper glass portion to provide a flow through opening.

Other objects and features of the invention will be apparent from the detailed description of the preferred embodiment.

BRIEF DESCRIPTION OF THE DRAWING

In the drawings:

FIG. 1 is a rear perspective fragmentary view of an automobile embodying the rear window construction of the invention with the window glass shown in open position; and FIG. 2 is a cross section view taken on line 2—2 of FIG. 1 but with the window glass seen in closed position.

DETAILED DESCRIPTION OF THE PREFERRED EMBODIMENT

The motor vehicle body structure seen fragmentarily in the drawing includes a roof 10, rear quarter panel 12, deck lid 14, upper deck panel 16, rear side window 18, rear window opening 20, rear window panel 22, package shelf 23, and rear seat back 24. Opening 20 is generally rectangular and is defined by a continuous flange 25 integral with the adjacent body structure; flange 25 includes an inturned portion 26 generally normal to the plane of the window opening and a further inturned fence portion 28 lying generally in the plane of the window opening. A continuous resilient sealing member 30 is positioned on, and extends completely around, fence 28.

Window panel 22 is formed of a flexible high strength safety glass, such as Chemcor. Glass 22 is generally rectangular and is positioned in window opening 20 with the forward edge of its periphery seating on the rearward face of sealing member 30. The upper edge of glass 22 and the upper portion of each side edge of the glass are fixedly secured to the body structure by bolts 32 passing through the peripheral edge of the glass, through sealing member 30, and through fence 28 for threaded engagement with nuts 34. Bolts 32 may be provided along approximately the upper half of the side edges of the glass so that approximately the upper half of the glass is anchored to the body. The lower edge of the glass and the lower portions of the side edges of the glass sealingly engage sealing member 30: this lower portion of the glass is therefore free to move rearwardly away from the window opening.

Flexing movement of the lower portion of the glass is controlled by suitable actuator means operatively connected to the lower glass edge. The actuator means may be manually or power operated. In the disclosed embodiment, the actuator means comprise a pair of vacuum motors 36 adapted to engage the lower glass edge at laterally spaced locations therealong. Each motor 36 includes a housing 38 suitably secured to the rearward face of the lower run of fence 28 and having upper and lower housing portions 38a and 38b, a diaphragm 40 clamped at its periphery between the peripherally confronting flanges at upper and lower housing portions 38a, 38b and a piston rod or working arm 42 suitably fastened to diaphragm 40 and extending upwardly and rearwardly through the upper wall of housing portion 38a, through fence 28, and through sealing member 30 to terminate in a flange portion 42a seated in a suitable counterbore in the adjacent rear face of the glass. A screw bolt 44 extends through the lower edge of the glass for threaded engagement with a threaded bore in the end of rod 42 to secure the rod to the glass. An exterior molding 46 of vinyl or other flexible material extends completely around the periphery of glass 22 to overlie and conceal bolts 32 and 44. Molding 46 is secured to the glass along the upper glass edge and along the upper portions of the side glass edges by bolts 32, and is secured to the glass along the lower glass edge by bolts 44. An interior trim molding (not shown) is also provided to conceal nuts 34 and the edge of fence 28.

In operation, an operator of the motor vehicle positioned in the driver's seat will selectively actuate the motor means by a control apparatus (not shown) of known form. In the case of the disclosed vacuum motors 36, the operator will selectively connect motor 36 to engine manifold vacuum to exahust air from the motor chamber through hose 48 and cause piston 40 and rod 42 to move outwardly; outward movement of rod 42 pushes the lower glass edge outwardly and rearwardly away from its sealing engagement with member 30 and causes the lower portion of the glass to bend or flex generally about a hinge line defined by the juncture of the upper restrained portion of the glass and the lower unrestrained portion. The open position of the window, with the lower glass portion flexed outwardly and rearwardly with respect to the fixed upper portion, is seen in FIG. 1. In this position, an air opening of considerable cross sectional area is provided at the lower edge of the rear window through which an abundant air flow occurs by virtue of the natural vacuum condition existing just rearwardly of the rear window opening during forward movement of the vehicle. The invention rear window construction thus provides an effective flow through ventilation arrangement requiring no major sheet metal alteration or modification.

It will be understood that the resiliency of the glass will cause the lower glass portion to return to its closed, sealed position when the motor chamber is again vented to atmosphere. To facilitate this resilient return movement, the shape of the rear window opening and/or the unrestrained shape of the glass panel may be selected to preload the glass in its closed position so that the lower portion of the glass is continuously urged by its own internal stress into sealing engagement with sealing member 30. If desired, double acting motor means, either of vacuum or other form, may be provided to move the lower glass positively in both opening and closing directions.

Although the invention has been herein illustrated and described in detail with reference to a preferred embodiment, it will be understood that various changes and modifications may be made in the disclosed embodiment without departing from the spirit or scope of the invention.

I claim:
1. A motor vehicle body structure comprising:
   (A) a generally horizontal rear deck structure;
   (B) a fixed roof structure overlying a passenger compartment disposed forwardly of said rear deck structure, said roof structure including a rear portion sloping downwardly to join said rear deck structure to define a pocket immediately behind said rear roof portion which develops a vacuum condition upon forward motion of the vehicle;
   (C) flange means integral with said roof structure rear portion defining a transversely extending rear window opening in said rear roof portion;
   (D) a piece of flexible glass of a size to fit within and fill said opening;
   (E) means on said body structure around a portion of said opening engaging a portion of the periphery of said glass to firmly fix the related portion of the glass piece to said body structure;
   (F) sealing means on said body structure around the remaining portion of said opening sealingly engaging the forward edge of the remaining portion of the periphery of said glass piece while allowing movement of the related glass portion rearwardly away from said sealing means; and
   (G) actuator means engaging the unrestrained portion of said glass piece at a location thereon spaced from the restrained portion and operative when actuated to flex the unrestrained glass portion relative to the fixed portion between a closed position in which the unrestrained portion coacts with said sealing means to sealingly close said opening and an opened position in which said unrestrained portion is flexibly bent outwardly and rearwardly away from said sealing means to open said passenger compartment to the vacuum pocket immediately rearwardly of said opening and thereby establish an exhaust air flow rearwardly out of said passenger compartment through said opening.

2. A body structure according to claim 1 wherein
   (A) said opening and said glass piece are both generally rectangular; and
   (B) said fixed peripheral glass portion includes the upper glass edge and the upper section of each side glass edge.

3. A body structure according to claim 1 or 2 wherein
   (A) said actuator means comprises a power motor.

4. A body structure according to claim 2 or 3 wherein
   (A) said actuator means includes an arm engaging said glass piece adjacent the lower glass edge so that movement of said arm in response to operation of said actuator means flexes said unrestrained glass portion between its open and closed positions.

5. A body structure according to claim 4 wherein
   (A) said sealing means includes a sealing strip extending along the lower edge of said opening; and
   (B) said arm comprises a rod passing through the adjacent portion of said sealing strip for engagement with said glass piece.

References Cited

UNITED STATES PATENTS 3,214,213   10/1965   Hezler _____ 160—37
3,398,483   8/1968   Ringel et al. _____ 49—34

FOREIGN PATENTS 1,356,859   2/1964   France.
531,577   1/1941   Great Britain.

J. KARL BELL, Primary Examiner

U.S. Cl. X.R.
49—34; 296—146